April 15, 1958
J. C. RHEUBY
2,830,882
SULPHURIC ACID CONCENTRATOR DRUM
Filed Dec. 28, 1956
3 Sheets-Sheet 1
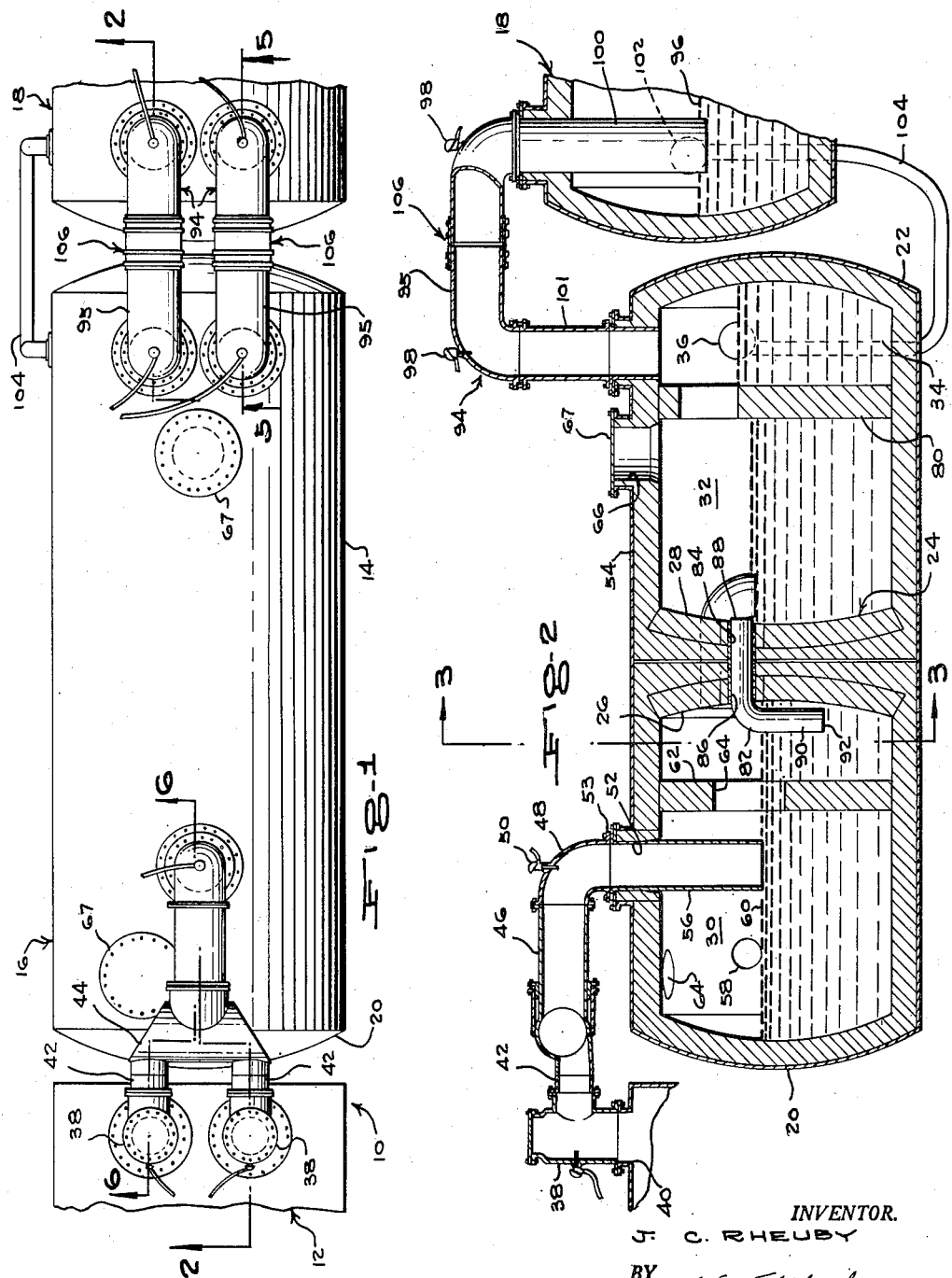
INVENTOR.
J. C. RHEUBY
BY W. E. Thibodeau
and Leonard Flank
ATTORNEYS

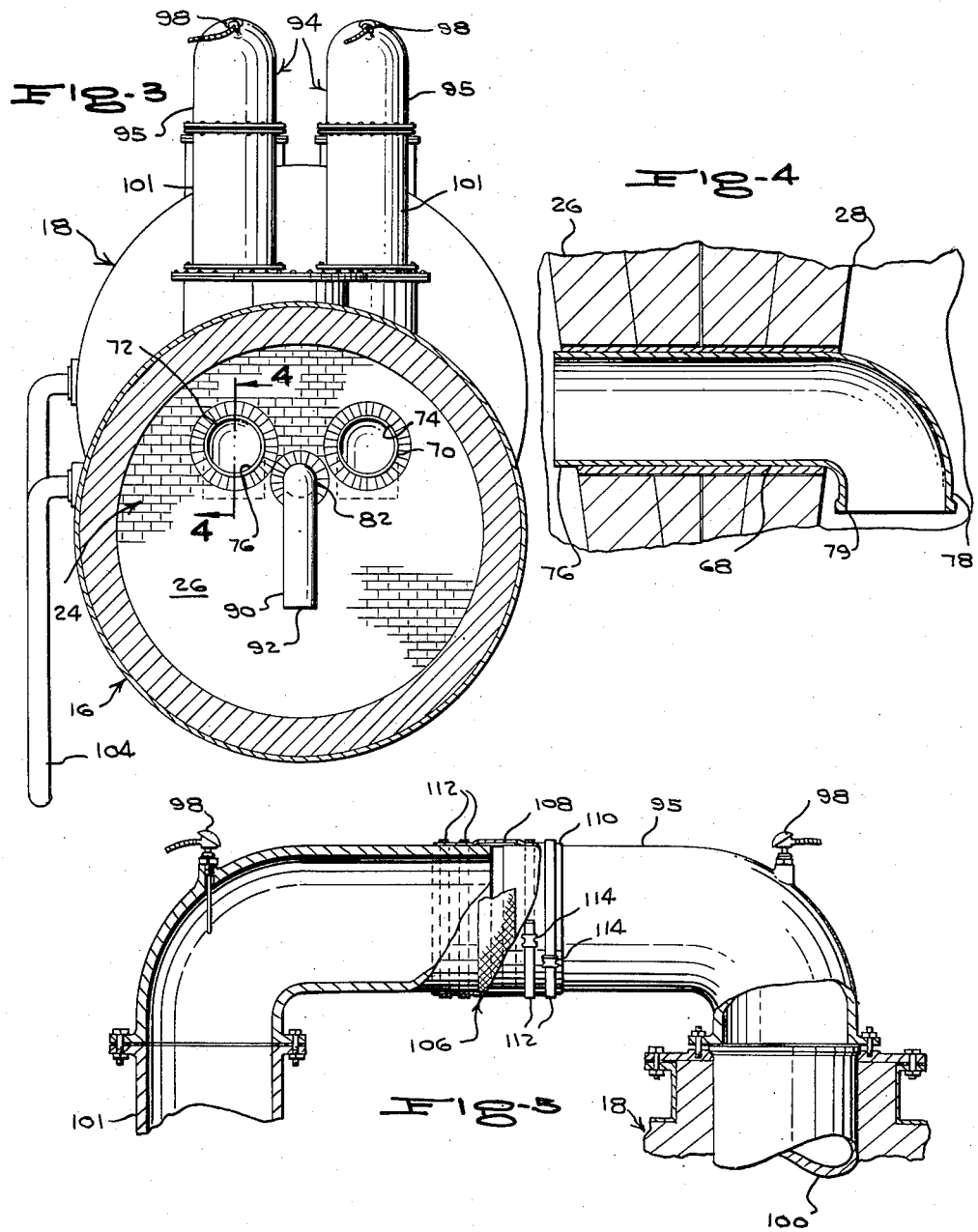

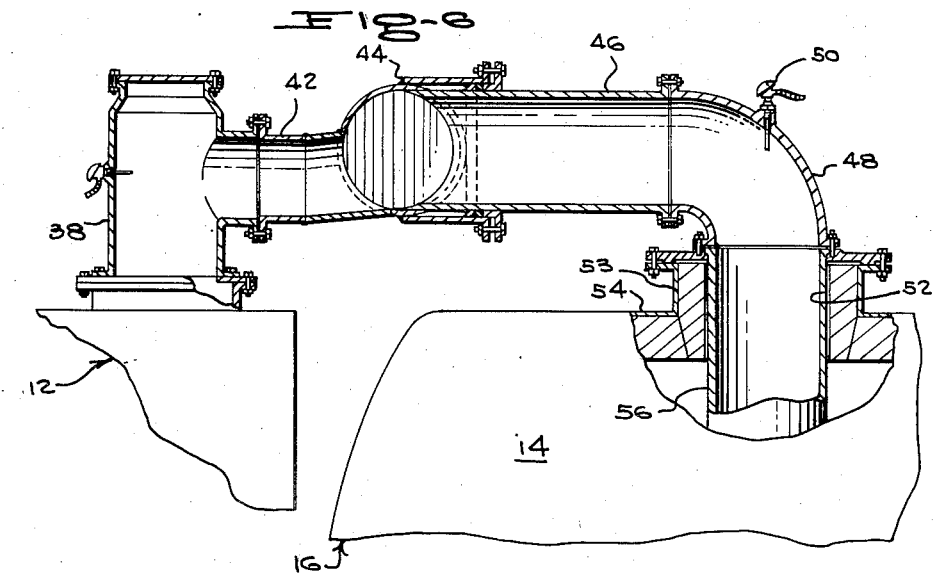
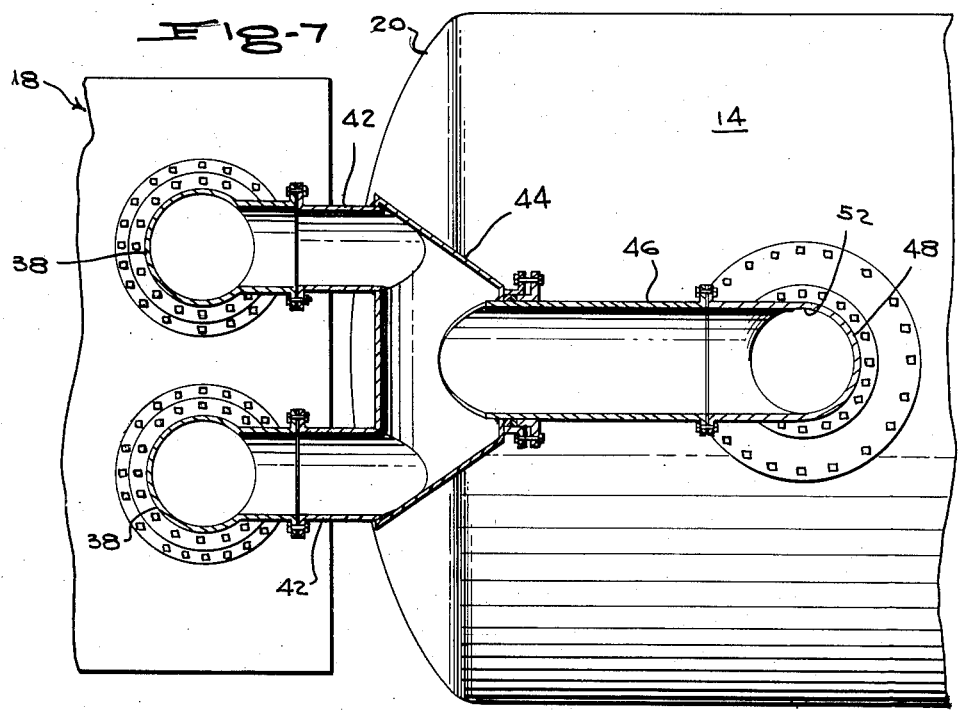

United States Patent Office 2,830,882
Patented Apr. 15, 1958

2,830,882

SULPHURIC ACID CONCENTRATOR DRUM

James C. Rheuby, Marion, Ill., assignor to the United States of America as represented by the Secretary of the Army Application December 28, 1956, Serial No. 631,383

1 Claim. (Cl. 23—276)

This invention relates to the concentrating of sulphuric acid and more particularly to the concentrator drum of the sulphuric acid concentrating apparatus.

One of the major problems in sulphuric acid concentrating apparatus is the breakage of the Duriron fittings and piping, which constitutes a major source of shutdown of the apparatus and expense in repair and maintenance. The piping is normally exposed to the elements in the conventional concentrating apparatus, such as those shown in U. S. Patents No. 1,991,745, and Re. 19,064, where the piping is subject to sudden large temperature variations. The resulting thermoshock to the piping accounts for considerable breakage. In addition, the packed brick thimble construction required to prevent the gas leakage in the piping is subject to misalignment due to the build-up of iron and lead sulphates under the concentrator shell. This misalignment creates tension on the piping causing periodic breakage.

In addition, there is the problem of a heat loss from the hot gases introduced into the concentrator drum of the apparatus through exteriorly exposed piping, and through similar exposed piping from the high stage chamber of the drum to the low stage chamber thereof. Since there is a considerable cost involved in providing fuel for a furnace to supply the hot gases employed in the concentrating apparatus, if the heat loss can be reduced or eliminated, a considerable saving in the cost of operation would be effected.

Still another problem confronting the use of the present acid concentrating apparatus is the control of acid fumes discharged from the concentrator so that the surrounding atmosphere is not laden with excessive amounts of acid fumes and avoid damage to the surrounding vegetation and building structures. Normally, the acid fume control is affected by the use of a precipitator in the smokestack discharging the fumes to the atmosphere. Hence, if the acid concentrating apparatus can be so designed to result in substantially no acid fumes discharged therefrom, the cost of the precipitator can be eliminated.

Therefore, it is an objective of this invention to provide an acid concentrator drum wherein the maintenance will be reduced to a minimum, while, at the same time, effecting a substantial saving in the cost of operation by reduced fuel cost while maintaining the unit at a maximum production level.

It is a further object of this invention to provide a sulphuric acid concentrator drum in which the discharge of corrosive acid fumes will be virtually eliminated to thereby obviate the necessity for the installation of a precipitator and the smoke discharge stack.

Thus, it is the principal object of this invention to provide an acid concentrator unit which will have increased over-all capacity due to fewer major shutdowns, result in direct savings in the operation of the unit by virtual elimination by maintenance thereon, and effect reduction of mist loading in stack gases to the point where it is hardly visible (23 mg./m$^3$). With regard to mist loading, a conventional sulphuric acid concentrator unit will normally have a mist loading of 200 mg./m$^3$.

The above and other objects may be attained by employing this invention which embodies among its features an acid concentrator drum which comprises in combination with a furnace generating heated gases, a concentrator drum body or tank being closed at both ends, a partition wall which extends transversally across the body intermediate the ends thereof so as to divide the body into a high stage chamber and a low stage chamber, the chambers being adapted to contain the acid to be concentrated, conduit means between the furnace and the high stage chamber of the drum body to introduce hot gases from the furnace into the high stage of the chamber, the partition wall being provided with at least one opening therethrough above the normal acid level of the chambers to permit passage of hot gases introduced into the high stage chamber from said high stage chamber into the low stage chamber, a pipe extending transversally through the partition wall below the opening therein for conducting acid from the low stage chamber and having a downwardly turned leg at the end thereof extending into the high stage chamber, the leg terminating below the acid level in the high stage chamber.

Other objects, features and advantages will become apparent from the following detailed description, forming the specification, and taken in conjunction with the accompanying drawings, in which:

Figure 1 is a top plan view of a concentrator drum embodying this invention, and shown in operative relation to a furnace and cooling drum at opposite ends thereof;

Figure 2 is a cross sectional view taken substantially along line 2—2 of Figure 1;

Figure 3 is a cross sectional view taken substantially along line 3—3 of Figure 2;

Figure 4 is a cross sectional view, on a somewhat enlarged scale taken along line 4—4 of Figure 3;

Figure 5 is a cross sectional view taken substantially along line 5—5 of Figure 1, and shown on a somewhat enlarged scale with portions thereof shown in elevation;

Figure 6 is an enlarged cross sectional view taken substantially along line 6—6 of Figure 1;

Figure 7 is a top plan view of the left-hand side of the concentrator drum, as viewed in Figure 1, on a somewhat enlarged scale with the piping leading from the furnace into the drum shown in transverse cross section.

With continued reference to the drawings, there is shown in Figure 1 a sulphuric acid concentrator unit, generally indicated at 10, which comprises a furnace generally indicated at 12 for generating hot or heated gases and operatively connected through suitable piping into a tank or body 14 of a concentrator drum, generally indicated at 16, adjacent the left-hand end of the drum as viewed in Figure 1. At the other end of the drum, the right-han end as viewed in Figure 1, suitable piping leads from the drum body 14 into a cooler drum, generally indicated at 18.

The unit 10 is designed to bring about the concentration of 72% sulphuric acid residual effluent from the nitric acid concentrating operations to a product acid strength of 93–95%. The principle involved is the direct injection into the acid of a hot flue gas-air mixture (1200° F.) from a furnace. The hot gases pass through concentrating stages countercurrent to the acid causing concentration of the acid by the transfer of water to the gas phase. The moisture laden gas is then discharged to the atmosphere through an appropriate smokestack, not shown.

In the conventional acid concentrator unit the weak feed acid enters the gas cooler drum and flows by gravity to the low stage of the concentrator drum and then to the high stage of the drum. The high stage of the concentrator drum discharges the then concentrated acid to acid coolers with the acid then overflowing into strong acid holding tanks from which it is pumped to storage. The gases which emanate from the furnace and pass into the acid by way of suitable Duriron pipes, finally pass through the gas cooler drum and through electrostatic precipitators in the stack and is then discharged to the atmosphere. Heat is transferred from the gas to the liquid phase, and water, as vapor, is given up by the acid to be concentrated in the concentrator tank during this process. The sulphuric acid which becomes entrained in the gas stream, along with that formed by the hydration of sulphur trioxide is partially separated in the gas cooler and removed at the electrostatic precipitator as a weak sulphuric acid (40–50%). The hot gases leave the furnace at a temperature of 1200° F. Here, the hot gases are split and passed into the high and low stages of the concentrator drum. The gas which leaves the high stage makes contact again with the acid in the low stage through suitable dip piping, where it joins with the gases introduced into the low stage from the furnace through suitable piping. The gases enter the cooler drum by way of the necessary piping and fittings to make contact with the weak acid introduced into the cooler drum, for the last time, before passing into the electrostatic precipitator.

The present unit proposes passing all of the furnace gases into the high stage chamber of the concentrator drum through a single dip pipe. The gas, after contact with the acid in the high stage chamber, passes through interior piped openings into the low stage chamber, and then out of the low stage chamber through the cooler and smokestack. Acid piping, conducting acid from the low to high stage, is entirely on the interior of the drum and conducts the acid directly through a brick partition wall separating the high stage from the low stage chamber.

The concentrator drum body is closed at its opposite ends 20 and 22 with a partition wall generally indicated at 24 having brick facings 26 and 28 on opposite sides thereof extending transversely across the interior of the body to divide the body into a high stage chamber 30 and a low stage chamber 32 on opposite sides of the partition wall.

The weak acid 34 contained in the low stage chamber 32, defines the acid to be concentrated by the removal of water therefrom, and is introduced into the low stage chamber through a suitable inlet 36 so that the weak acid can be fed thereinto from a suitable storage container.

A pair of upstanding pipes 38, defining outlets, are secured to the top of the furnace 12 in registry with openings 40 through the top of the furnace so that the hot gases generated in the furnace will enter into the pipes 38 which are closed at their upper end, as can be clearly seen in Figures 1 and 2.

A pair of spaced, parallel conduit pipes 42 have one end thereof connected in communication with the interior of the respective outlet pipes 38 and extend laterally therefrom toward the adjacent end 20 of the concentrator drum body and into a reducing T 44. A length of pipe 46 extends from the other end of the reducing T to conduct the hot gases from the furnace into one end of an elbow 48. The elbow 48 is provided with a relief valve 50, which is manually operable, for selectively reducing the pressure of the gases in the elbow.

The other end of the elbow 48 is connected in communication with an opening 52 at the point from which it emerges through a boss 53 on the side wall 54 of the drum body 14. A dip pipe 56 extends upwardly through the opening 52 and is in communication with the elbow 48 with the lower end of the dip pipe terminating adjacent the normal level of the strong acid 58 and the high stage chamber 30. This will introduce the hot gases from the furnace into the high stage chamber.

It will be noted that the terminal end 60 of the dip pipe 56 is disposed at the exact level of the strong acid 58. Within the high stage chamber 30, there is provided a baffle or wall 62 having at least one opening 64 transversely therethrough to permit communication of the acid 58 on opposite sides of the wall. The purpose of the baffle 62 is to prevent surging of the acid 58 as the hot gases are introduced into the chamber 30.

The side wall 54 of the drum body is provided with manholes 64 and 66 opening into the chambers 30 and 32 respectively. Each of the manholes is covered with a removable cover plate 67 to provide access into the interior of the drum body 14.

With particular reference to Figures 3 and 4, the conventional dip pipe end gas line is replaced by an interior piping arrangement which utilizes as a dip pipe, a pair of spaced, parallel elbows 68 and 70 passing through spaced parallel openings 72 and 74 respectively through the partition wall 24 above the level of the acid in the chambers, and disposed to opposite sides of a vertical center line through the partition wall. One end of the elbows 68 and 70, as indicated at 76 in Figure 4, open through the partition wall and into the high stage chamber 30. The downwardly directed portion 78 of each of the elbows 68 and 70 opens into the low stage chamber 32 slightly below the level of the acid therein and to the side of the baffle 80, similar to the baffle 62, remote from the drum body end 22. It has been found that the optimum results are accomplished with an immersion of the elbow end 79 into the weak acid 34 of approximately two inches.

Thus, the pipes or elbows 68 and 70 provide a passage through the partition wall 24 to permit the entrance of hot gases therein, with the hot gases introduced into the weak acid 34 below the level of the acid in the chamber 32. This is accomplished without the use of any exterior, cross-over piping as would be the case in the conventional sulphuric acid concentrator drum.

Additionally, a cross-over leg 82, in the form of an L-shaped length of pipe having one straight portion 84 extending through an aperture 86 provided transversely through the portion wall 24 and along its vertical center line between the openings 72 and 74, as clearly shown in Figure 3. The terminal end 88 of the straight portion 84 opens into the chamber 32 at, or just slightly below, the level of the acid 34 contained in the chamber 32. The downwardly projecting portion 90 of the cross-over leg 82 has its open end 92 terminating at a considerable distance below the level of the strong acid 58 in the high stage chamber 30. This cross-over leg 82 is also an internal piping arrangement.

As the hot gases pass through the chamber 30 and the passages provided by the elbows 68 and 70 into the weak acid 34, water in the weak acid is changed from the liquid to the gaseous state and passes from the chamber 32 through piping, generally indicated at 94, in comunication at one end with the interior of the chamber 32 and at its other end below the level of the liquid 96 in the cooler drum 18. From the cooler drum the gases pass into the atmosphere through the conventional smokestack.

It has been determined that the gas temperature leaving the cooler 18 is about 20° F. lower than the gases of the conventional sulfuric acid concentrator unit as they leave the cooler. This phenomenon will permit feeding hot residual sulphuric acid directly from nitric acid concentrator units and increase the production rate of the present acid concentrator to an appreciable degree. In addition, the lower gas discharge temperatures will affect a 40% reduction in the acid fumes discharged from the concentrator unit and the need for electrostatic precipitators will have been virtually eliminated. The elimination of the precipitator, not only saves considerable costs on maintenance, but reduces the electrical demands and daily cleaning of the rotary rectifiers of the precipitator resulting in a considerable cost saving for the overall operation of the concentrator unit.

As shown in Figures 1 and 3, the piping 94 comprises a pair of identical spaced, parallel conduits 95, each provided with a manually operated gas pressure regulating relief valve 98, similar to the valve 50, for the purpose of selectively controlling the pressure of the gases and vapors passing through the piping 94 from the low stage 32 of the concentrator drum to the cooler drum. A leg 100 at one end of the conduits 95 enters into the interior of the cooler drum 18 (Figure 2) through the top thereof and terminates slightly below the level of the liquid 96 with the drum 18. As the level of the liquid 96, a weak acid solution, rises in the cooler drum, it is drained off through an overflow outlet 102, through an acid resistant pipe 104 and empties into the low stage chamber 32 through a suitable connection with the inlet opening 36. Thus, there is a supply of weak acid being constantly fed into the chamber 32 from the cooler drum in addition to the weak acid supplied from a source of weak acid remote from the cooler drum and concentrator drum.

On each of the conduits 95, the separate elements of piping conduit are joined together between the opposite end legs 100 and 101 by a "Teflon" film wrapped expansion joint, generally indicated at 106, to eliminate the repacking operation of the conventional packed sleeve expansion joints, formerly employed in this type of concentrator unit for connecting lengths of conduit piping together, after a shutdown operation or as a result of breakage to the piping. A relatively wide band of "Teflon" tape 108 (Figure 5) is wrapped about the abutting ends of the piping conduit sections to be joined so as to span the separation therebetween. A lead sleeve 110 overlies the tape 108 and embraces the joining ends of the conduit sections being joined. A plurality of steel bands 112 extend in longitudinally spaced relation about the sleeve 110 and have their opposite ends secured in banding clamps 114, arranged in staggered relation, to tightly secure the band 112 about the lead sleeve. An equal number of bands 112 are used on opposite sides of the juncture of the conduit sections being joined.

I claim:

In an acid concentrating unit including a furnace generating hot gases, an acid concentrator drum operatively connected to said furnace to receive hot gases from the furnace therein, and a cooler drum operatively connected to said concentrator drum to receive gases and vapors discharged from said drum prior to discharge of the gases and vapors to atmosphere, the improvement residing in said concentrating unit which comprises a cylindrical drum body, closed at both ends thereof, an acid resistant partition wall having brick facings on opposite sides thereof, extending transversely across said body intermediate the ends thereof to divide the body into first and second chambers, said first chamber adapted to contain highly concentrated acid, said second chamber adapted to contain weak acid, a baffle wall extending transversely across each said first and second chambers and being spaced a substantial distance from said partition wall in said first chamber and an adjacent end in said second chamber, there being a transverse opening in each said baffle, means operatively connected to said body for introducing a weak acid solution into said second chamber, conduit means between said furnace and one end of said body for conducting hot gases generated in said furnace into said first chamber comprising a pair of conduits connected to said furnace at one of their ends and to a reducing T at their other ends, a single conduit connected at one of its ends to said reducing T and extending downwardly into said first chamber and terminating adjacent the normal acid level therein, a pair of spaced parallel conduit pipes extending through said partition wall and opening into said chambers on opposite sides of said wall and above the acid level in said first and second chambers, each said pipe having a downwardly extending leg projecting below the acid level in said second chamber to define passages through which the hot gases in said first chamber will flow beneath the surface of the acid level in said second chamber to vaporize the water in said weak acid solution, an acid conducting pipe extending through said wall between said conduit pipes and the acid level to transfer therethrough the acid concentrated by action of the hot gases in said second chamber into said first chamber, said acid conducting pipe having a dependent leg terminating below the acid level in said first chamber, an overflow outlet provided in said first chamber to define an acid level determining means, there being a passage for the concentrated acid from said first chamber to a place of storage and means for reducing mist loading in stack gases including piping connecting said second chamber in communication with said cooler drum to direct the flow of gases and vapors from said second chamber into said cooler drum, said piping comprising a first pair of spaced parallel pipes entering said cooler drum and terminating slightly below the level of a liquid therein, a second pair of parallel pipes having one of their ends in spaced opposed alignment with the ends of said first pair of pipes and communicating at their other ends within said second chamber in said drum, an expansion joint connecting said first and second pairs of pipes comprising a wide band of tape encircling the aligned ends of said pairs of pipes, a lead sleeve of greater width than said tape encircling said tape and aligned ends of said pipes and a plurality of steel bands encircling said sleeve in spaced relation and having their ends secured by clamps arranged in staggered relation about said sleeve, there being an equal number of bands placed on opposition sides of said joint.

References Cited in the file of this patent

UNITED STATES PATENTS

| | | |
|---|---|---|
| Re. 19,064 | Mast | Jan. 23, 1934 |
| 1,991,745 | Hechenbleikner | Feb. 19, 1935 |